(12) United States Patent
Douglas

(10) Patent No.: US 7,506,563 B2
(45) Date of Patent: Mar. 24, 2009

(54) INDEXABLE MOUNT FOR A TOOL HEAD

(75) Inventor: James Morley Hulme Douglas, St Peter Port (GG)

(73) Assignee: Asterika Limited, Limassol (CY)

( * ) Notice: Subject to any disclaimer, the term of this patent is extended or adjusted under 35 U.S.C. 154(b) by 62 days.

(21) Appl. No.: 10/518,312

(22) PCT Filed: Jun. 17, 2003

(86) PCT No.: PCT/EP03/06369

§ 371 (c)(1),
(2), (4) Date: Aug. 8, 2005

(87) PCT Pub. No.: WO04/001249

PCT Pub. Date: Dec. 31, 2003

(65) Prior Publication Data

US 2006/0065505 A1   Mar. 30, 2006

(30) Foreign Application Priority Data

Jun. 19, 2002   (IT)   .......................... MI2002A1352

(51) Int. Cl.
*F16D 1/12* (2006.01)
*F16D 11/14* (2006.01)
(52) U.S. Cl. .............................. 74/816; 188/69; 192/108
(58) Field of Classification Search ................... 192/69, 192/69.8, 69.82, 108; 269/61, 64; 74/816
See application file for complete search history.

(56) References Cited

U.S. PATENT DOCUMENTS

| | | | |
|---|---|---|---|
| 3,276,052 A | | 10/1966 | Herbkersman |
| 3,480,122 A | | 11/1969 | Ball et al. |
| 3,961,780 A | * | 6/1976 | Saj ............................... 269/64 |
| 4,274,773 A | * | 6/1981 | Burkhardt et al. ............. 269/61 |
| 4,463,488 A | * | 8/1984 | Pieczulewski ........... 29/893.35 |

FOREIGN PATENT DOCUMENTS

| | | |
|---|---|---|
| DE | 31 22 575 | 12/1982 |
| EP | 1 160 472 | 12/2001 |

* cited by examiner

*Primary Examiner*—Rodney H Bonck
(74) *Attorney, Agent, or Firm*—Andrew Wilford

(57) ABSTRACT

A treatment head of a tool machine and a member are relatively angularly positioned by an angularly indexable mount having a first coupling having first and second elements displaceable relative to each other, each formed with a respective array of a respective predetermined number of teeth, and respectively connected to the member and the treatment head. The number of teeth of the first-coupling first element varies by more than one from the number of teeth of the first-coupling second element. A second coupling meshable with the first coupling has first and second elements engageable with the first and second elements of the first coupling, fixed relative to each other, and each formed with a respective array of a respective predetermined number of teeth. The number of teeth of the second-coupling first element varies by more than one from the number of teeth of the second-coupling second element.

3 Claims, 3 Drawing Sheets

INDEXABLE MOUNT FOR A TOOL HEAD

CROSS REFERENCE TO RELATED APPLICATIONS

This application is the US national phase of PCT application PCT/EP2003/006369, filed 17 Jun. 2003, published 31 Dec. 2003 as WO 2004/001249, and claiming the priority of Italian patent application MI2002A001352 itself filed 19 Jun. 2002 whose entire disclosures are herewith incorporated by reference.

FIELD OF THE INVENTION

The present invention refers to a mount between members of a machine.

BACKGROUND OF THE INVENTION

In particular, hereafter reference shall be made to mounts of the type usually used for example in machine tools for supporting and orienting a rotary head or else a rotary table. In other examples, such mounts are used to displace or angularly position a member of a machine with respect to another, for example the mount can be used in marble machines, machines for joinery, manipulators, etc.

Currently there are two types of chip machines: continuous treatment machines and discontinuous treatment machines.

The first (i.e. continuous treatment machines) are equipped with a treatment head or workpiece-carrying table the position and mutual orientation of which can be modified continuously by stepper motors controlled by the electronics of the machine. Machines of this type allow even very complex treatments to be carried out but, however they have drawbacks which in practice limit their use above all to very coarse treatments. Indeed, continuous treatment machines, during operation, generally have high vibration, low chip removal and, therefore, long treatment times. Moreover, continuous treatment machines are usually very expensive and are not very strong and a limited resolution. Usually the maximum resolution that can be obtained with a continuous treatment machine is equal to 0.001°.

Discontinuous treatment chip machines, on the other hand, are made using Hirth mounts. Hirth mounts have two identical disks, equipped with face teeth connected together engaging the respective teeth between them. The disks can be rotated with respect to each other before connection so as to be positioned as required by the treatment being carried out and, therefore, so as to position as desired the mechanical member connected to them, usually consisting of the workpiece-carrying table or else the treatment head. The mounts of the type indicated are widely used in practice since they allow the machine members to be positioned as required for the particular treatment being carried out and the connection between the disks is strong and precise enough to be used even for calibrated positioning.

Machines which use Hirth mounts are usually strong, they are not affected by vibrations and they allow large quantities of chips to be removed at each run. However, they are not very flexible and their use becomes all the more difficult, up to the point of becoming practically impossible, when very high resolutions are desired. Indeed, the resolution which can be obtained with conventional mounts of this type becomes greater as the number of teeth on the disks (of the same type) becomes greater. This is due to the fact that the disks have the same number of teeth and, therefore, the greater the number of teeth, the greater the number of positions in which a disk of 360° is divided (the positions are defined, for example, by the gaps between two teeth of a disk in which the teeth of the other disk engage). This necessarily implies that to obtain greater resolution and, therefore, to divide the 360° angle into many positions it is necessary to increase the number of teeth. Moreover, it must be considered that the teeth must transmit torque and, therefore, their thickness cannot be too thin otherwise they would be too weak and there could be the risk, if subjected to too high forces, of them breaking.

Of course, these two drawbacks combined with each other mean that in practice as the required resolution increases the diameter needed for the disks increases and, therefore, the bulk, the weight, etc. increases.

OBJECTS OF THE INVENTION

The object of the present invention is, therefore, that of realizing a mount between members of a machine which allows the aforementioned technical drawbacks of the prior art to be eliminated.

In this technical task, an object of the invention is providing a mount between members of a machine which is flexible and capable of working with very high resolution.

Another object of the invention is that of making a mount which is very strong. In particular, the teeth which allow the mutual connection of the disks are very strong and must not preferably be made very thin to increase the resolution of the mount.

The last but not least object of the invention is that of providing a mount which is very light and not very bulky, in particular compared with an analogous conventional mount.

SUMMARY OF THE INVENTION

These objects, according to the present invention are accomplished by a mount between members of a machine comprising at least one first and one second coupling suitable for being connected together to position the members of the machine in a work position. The first coupling comprises first and second toothed elements relatively movable between an initial reference configuration and a work configuration corresponding to a predetermined orientation of the members of the machine, the second coupling comprising at least two toothed elements fixed together with the initial configuration and mutual displacement means of the second coupling with respect to the first coupling suitable for taking the second coupling into a connection position with the first coupling once the work condition of the first coupling has been reached in correspondence with a small relative displacement between the first and second toothed elements of the first coupling equal to the difference between the sum of the pitch of two or more teeth of the first toothed element of the first coupling and the sum of the pitch of two or more teeth of the second toothed element of the first coupling.

BRIEF DESCRIPTION OF THE DRAWING

Further characteristics and advantages of the invention shall become clear from the description of a preferred but not exclusive embodiment of the mount between members of a machine according to the invention, where the mount is illustrated for indicating and not limiting purposes in the attached drawings, wherein.

SPECIFIC DESCRIPTION

Figure 1:
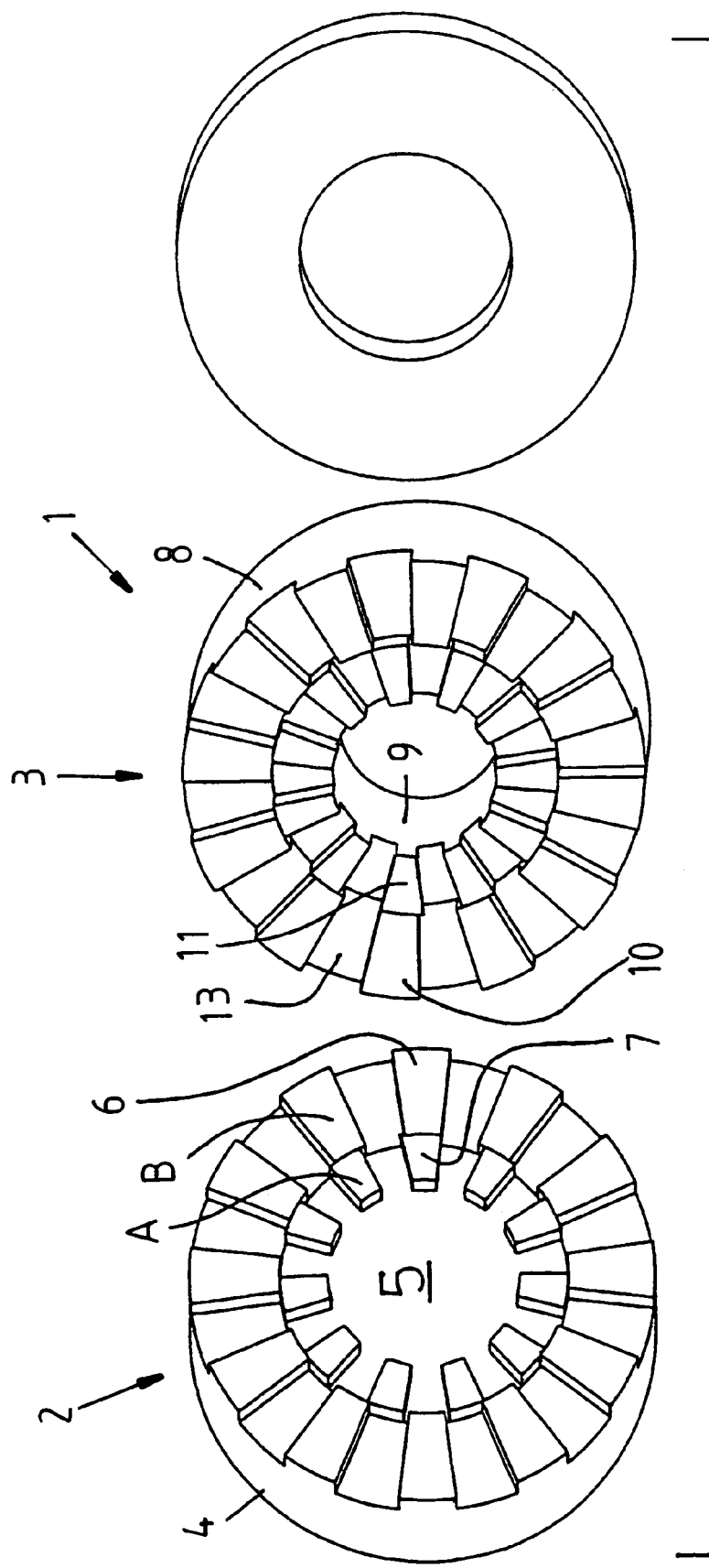
FIG. 1 shows an exploded perspective view of the mount according to the invention.
Figure 2:
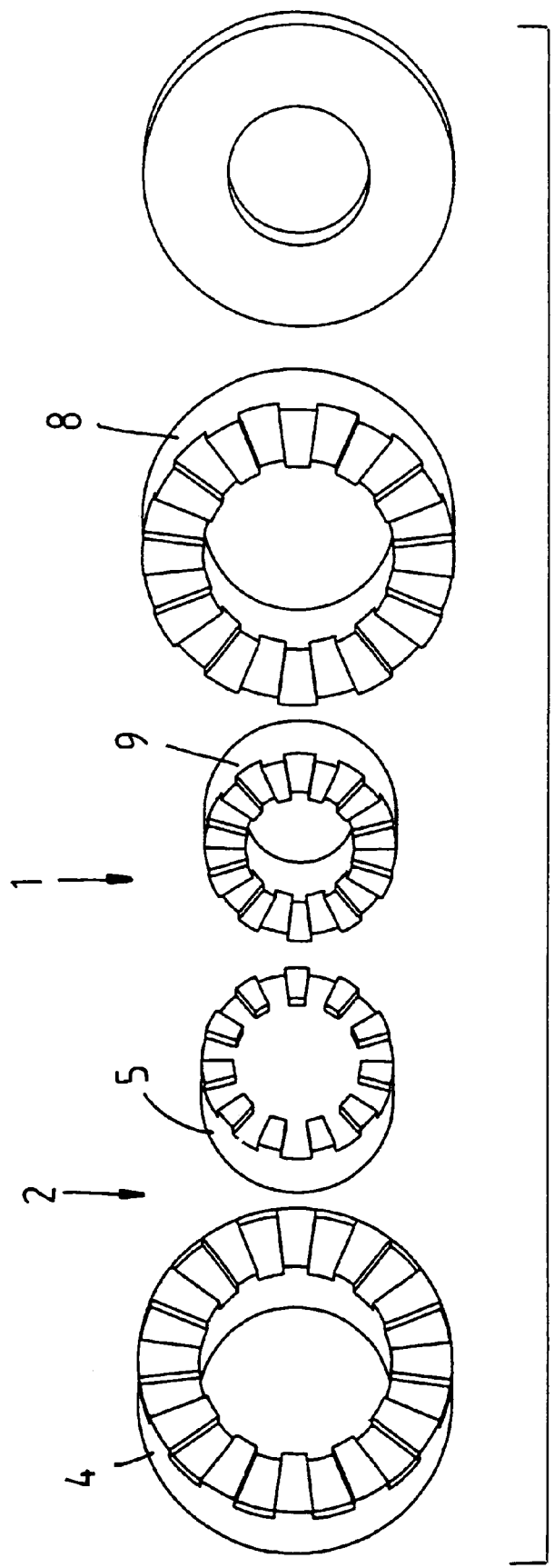
FIG. 2 shows a perspective view of the elements of the mount according to the invention.
Figure 3:
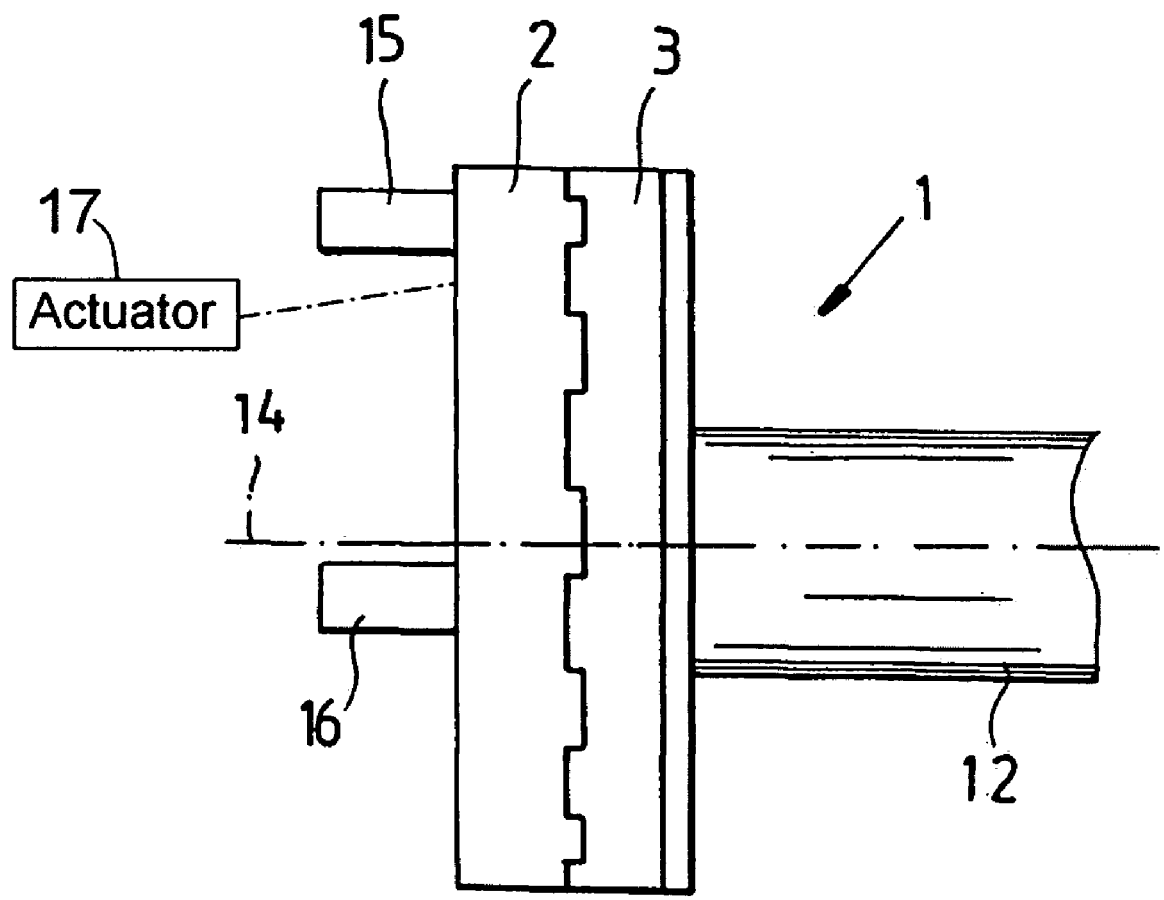
FIG. 3 shows a side view of two couplings coupled together.

With reference to the drawing, a mount between members 15 (e.g. the workpiece-support table or treatment head) and 16 (e.g. the base) of a machine is shown, wholly indicated with reference numeral 1. The mount 1 comprises a first and second couplings 2 and 3 suitable for being connected together to position the members 15 and 16 of the machine in work position. An actuator shown schematically at 17 can shift the parts axially into and out of engagement with each other as described below.

In particular, the first coupling 2 comprises two toothed elements 4 and 5 movable relative to each other between an initial reference configuration and a work configuration corresponding to a predetermined orientation of the members 15 and 16 of the machine. Such toothed elements 4 and 5 are connected to the members 15 and 16 of the machine which must be positioned with respect to each other.

FIG. 1 represents an example of a coupling in which the reference is defined by the teeth 6 and 7 respectively of the elements 4 and which are aligned.

The second coupling 3 comprises two relatively fixed toothed elements 8 and 9 having the initial configuration defined by the teeth 10 and 11 aligned with each other and aligned with the teeth 6 and 7 so as to allow the mutual connection of the two couplings.

The mount 1 also comprises displacement means 12 of the second coupling 3 with respect to the first coupling 2, suitable for taking the second coupling 3 into a connection position with the first coupling 2.

The toothed elements 4, 5, 8, and 9 are of simple construction and are very practical to use. However, in different embodiments the couplings 2 and 3 have connection means different from teeth such as, for example, cylindrical pins inserted in holes, etc.

Suitably, the displacement means 12 is suitable for displacing or rotating the second coupling 3 with respect to the first coupling 2 by an amount proportional to the relative displacement of the two elements 4 and 5 of the first coupling 2.

As shown in the attached figures, preferably the relatively movable toothed elements 4 and 5 of the first coupling 2 have an annular configuration and are concentric and, correspondingly, the relatively fixed toothed elements 8 and 9 of the second coupling 3 also have an annular configuration and are concentric.

Moreover, the relatively movable toothed elements 4 and 5 of the first coupling 2 have different numbers of teeth and, at the same time, the relatively fixed toothed elements 8 and 9 of the second coupling 3 also have different numbers of teeth. Advantageously, the inner mobile toothed elements 5 and the inner fixed toothed elements 9 have fewer teeth than corresponding outer mobile toothed elements 4 and outer fixed toothed elements 8.

In this way, the teeth of the inner toothed elements have a large thickness (in any case greater than the case in which the teeth of the inner elements are greater in number with respect to the teeth of the outer elements) and are, therefore, very strong.

In a different example the inner mobile toothed elements 5 and the inner fixed toothed elements 9 have a greater number of teeth than corresponding outer mobile toothed elements 4 and outer fixed toothed elements 8.

Moreover, the inner mobile toothed element 5 and the inner fixed toothed element 9 have the same number of teeth and, in the same way, the outer mobile toothed element 4 and the outer fixed toothed element 8 have the same number of teeth.

In a preferred embodiment, the difference between the number of teeth of the outer mobile toothed elements 4 and of the inner mobile toothed elements 5 is greater than one and, moreover, the difference between the number of teeth of the outer fixed toothed elements 8 and of the inner fixed toothed elements 9 is greater than one.

For example, by realizing inner mobile and fixed elements equipped with 32 teeth and outer mobile and fixed toothed elements with 45 teeth, a resolution of 0.25° can be obtained.

Thus, by rotating the inner toothed element with respect to the outer toothed element of the first coupling in a certain direction by an amount equal to such a minimum resolution, the alignment between the seventh tooth of the outer toothed element and the fifth tooth of the inner toothed element of such a first coupling is recreated, then the second coupling is rotated by 56° in the opposite direction to the direction of rotation of the inner toothed element of the first coupling so as to engage with the first coupling.

Advantageously, the machine is a chip machine and the mount connects a workpiece-carrying table and/or a treatment head and/or a workpiece-carrying chuck and/or a divider to a structure of the machine.

In other examples the machine is a divider or else a machine for treating wood or marble, a grinder, a welder, a measuring instrument, machines which operate in gradual measurement, textile machines, etc. In practice, the mount assembly according to the present invention can advantageously be used in whatever mechanism, even manual, that needs to make gradual divisions.

The operation of the mount between members 15 and 16 of a machine according to the invention is clear from that which has been described and illustrated and, in particular, is substantially the following.

Initially, the two couplings are meshed together and the reference elements are aligned with each other.

In practice, therefore, the two couplings are meshed together and the teeth 6 and 7 of the first coupling 2 are aligned with the gaps 13 between the teeth 10 and 11 of the second coupling 3. In this way the two couplings 2 and 3 can be connected together by making them move axially toward each other along their common axis 14.

When one wishes to change the relative orientation of piece-carrying table or treatment head, the inner mobile element 5 is rotated, with respect to the outer mobile element 4, by an amount which is sufficient to position the piece-carrying table or treatment head as desired.

Then, to connect the two couplings, the second coupling 3 is rotated by a predetermined amount proportional to the rotation applied to the inner mobile element 5.

For example, the small displacement which it is possible to realize with the mount assembly represented in the drawing is equal to 2.7272°, which is realized by aligning the teeth A and B after the teeth 7 and 6 and by rotating the second coupling 3 by 30° in the opposite direction to align it with the first coupling 2 and to allow the connection.

In this way, the reference of the second coupling 3 (i.e. the hollow 13 defined by the aligned teeth 10 and 11 which are fixed with respect to each other) is brought back aligned with the new reference of the first coupling (i.e. with the aligned teeth A and B), making the connection between the two couplings 2 and 3 possible.

Hereafter, some examples of mounts of the type indicated shall be described and they shall be compared with equivalent conventional mounts.

In a first example, we want to realize a mount that is able to obtain a resolution of 1°.

Thus, considering an outer toothed element with 40 teeth with an angular pitch of 9° and an inner toothed element with 9 teeth with an angular pitch of 40°, and rotating the inner toothed element with respect to the outer toothed element of the first coupling in a certain direction of rotation by an amount equal to such a minimum resolution, the alignment between the ninth tooth of the outer toothed element and the second tooth of the inner toothed element of such a first coupling is recreated, then the second coupling is rotated by 81° in the same direction as the direction of rotation of the inner toothed element of the first coupling so as to engage with the first coupling.

It must be noted that meshing of the first and second couplings is made possible by the fact that the work configuration thus obtained by the first coupling recreates the initial reference configuration of the first coupling wherein, however, in place of the teeth of the initial reference configuration, the ninth tooth of the outer toothed element and the second tooth of the inner toothed element of the first coupling are aligned.

As is clear, the minimum resolution which can be obtained is equal to the difference between the sum of the pitch of the ninth tooth of the outer toothed element and the sum of the pitch of two teeth of the inner toothed element.

Using a conventional mount toothed elements would have to be realized having an outer diameter equal to about 500 mm (due to the smallest possible size of the teeth for reasons of strength and the number of teeth necessary).

Using the mount according to the invention, on the other hand, toothed elements having an outer diameter of about 70 mm are sufficient.

In a second example we want to realize a mount that is able to obtain a resolution of 0.5°.

Using a conventional mount toothed elements would have to be realized having an outer diameter equal to about 500 mm, whereas using the mount according to the invention toothed elements having an outer diameter of about 70 mm are sufficient.

In a third example we want to realize a mount that is able to obtain a resolution of 0.25 °.

Using a conventional mount toothed elements would have to be realized having an outer diameter equal to about 1000 mm, whereas using the mount according to the invention toothed elements having an outer diameter of about 100 mm are sufficient.

In a fourth example we want to realize a mount that is able to obtain a resolution of 0.1°.

Using a conventional mount toothed elements would have to be realized having an outer diameter equal to about 3000 mm, whereas, using the mount according to the invention toothed elements having an outer diameter of about 125 mm are sufficient.

In a fifth example we want to realize a mount that is able to obtain a resolution of 0.05°.

Using a conventional mount toothed elements would have to be realized having an outer diameter equal to about 5500 mm, whereas using the mount according to the invention toothed elements having an outer diameter of about 180 mm are sufficient.

In a sixth example we want to realize a mount that is able to obtain a resolution of 0.01°.

Using a conventional mount toothed elements would have to be realized having an outer diameter equal to about 25,000 mm, whereas using the mount according to the invention toothed elements having an outer diameter of about 240 mm are sufficient.

In a seventh example we want to realize a mount that is able to obtain a resolution of 0.005°.

Using a conventional mount toothed elements would have to be realized having an outer diameter equal to about 50,000 mm, whereas using the mount according to the invention toothed elements having an outer diameter of about 500 mm are sufficient.

In an eighth example we want to realize a mount that is able to obtain a resolution of 0.001°.

Thus, considering an outer toothed element with 625 teeth and an inner toothed element with 9 teeth, and rotating the inner toothed element with respect to the outer toothed element of the first coupling in a certain direction of rotation by an amount equal to such a minimum resolution, the alignment between the fifty-first tooth of the outer toothed element and the forty-seventh tooth of the inner toothed element of such a first coupling is recreated, then the second coupling is rotated by 29,376° in the same direction as the direction of rotation of the inner toothed element of the first coupling so as to achieve the engagement with the first coupling.

Using a conventional mount toothed elements would have to be realized having an outer diameter' equal to about 250,000 mm, whereas using the mount according to the invention toothed elements having an outer diameter of about 550 mm are sufficient.

In a ninth example we want to realize a mount that is able to obtain a resolution of 0.0005°.

Using a conventional mount toothed elements would have to be realized having an outer diameter equal to about 500,000 mm, whereas using the mount according to the invention toothed elements having an outer diameter of about 1000 mm are sufficient.

In a tenth example we want to realize a mount that is able to obtain a resolution of 0.0001°.

Thus, considering an outer toothed element with 3125 teeth and an inner toothed element with 1152 teeth, and rotating the inner toothed element with respect to the outer toothed element of the first coupling in a certain direction of rotation by an amount equal to such a minimum resolution, the alignment between the 963rd tooth of the outer toothed element and the 355th tooth of the inner toothed element of such a first coupling is recreated, then the second coupling is rotated by 1,109,376° in the same direction as the direction of rotation of the inner toothed element of the first coupling so as to achieve the engagement with the first coupling.

Using a conventional mount toothed elements would have to be realized having an outer diameter equal to about 2,500,000 mm, whereas using the mount according to the invention toothed elements having an outer diameter of about 2400 mm are sufficient.

The present invention also refers to a machine tool equipped with the mount described previously.

The machine tool comprises a mount between its members which comprises a first and a second coupling suitable for being connected with each other to mutually position the members 15 and 16 in work position.

The first coupling comprises at least two toothed elements relatively movable between an initial reference configuration and a work configuration corresponding to a predetermined orientation of the members 15 and 16 of the machine tool.

The second coupling comprises at least two relatively fixed toothed elements having the initial configuration and displacement means of the second coupling with respect to the first coupling suitable for taking the second coupling into a connection position with the first coupling.

In practice, it has been noted how the mount between members 15 and 16 of a machine according to the invention is particularly advantageous because it is very precise and strong, it allows complete reproducibility, it has substantial resolution and, at the same time, it has low bulk and weight.

The mount between members 15 and 16 of a machine thus conceived is susceptible to numerous modifications and variants, all covered by the inventive concept. Moreover, all of the details can be replaced with others which are technically equivalent.

In practice, the materials used, as well as the sizes, can be whatever, according to the requirements and the state of the art.

The invention claimed is:

1. In combination with two relatively angularly positionable parts of a machining apparatus, an angularly indexable mount comprising:
    a first coupling having
        an outer ring element centered on an axis and having an axially directed outer array of a predetermined number of outer teeth and
        a fixed inner element surrounded by the outer element, the outer element being angularly displaceable relative to the inner element about the axis, the inner element having an inner array of a predetermined number of inner teeth directed axially in the same direction as the teeth of the outer ring element, one of the elements being connected to one of the parts and the other of the elements being connected to the other of the parts, the number of outer teeth of the outer element varying by more than one from the number of inner teeth of the inner element; and
    a second coupling centered on the axis and having
        an annular outer array of outer teeth engageable axially with and complementary to the array of outer teeth of the first coupling and
        an inner array of inner teeth engageable axially with and complementary to the array of inner teeth of the first coupling, the arrays of the second coupling being fixed angularly relative to each other, the number of teeth of the second-coupling outer array varying by more than one from the number of teeth of the second-coupling inner array, the couplings being shiftable relative to each other between a disengaged position with the teeth of the first coupling out of engagement with the teeth of the second coupling and a work position with the outer teeth of the first and second couplings elements meshing and the inner teeth of the first and second couplings meshing such that a minimum resolution is produced from a difference between difference of more than one tooth of the outer and inner teeth of the first coupling.

2. The mount defined in claim 1 wherein the teeth are uniformly angularly distributed in the respective arrays.

3. The mount defined in claim 1 wherein the second coupling is displaceable with respect to the first coupling by an amount proportional to the relative displacement of the two elements of the first coupling on change of relative position of the machine and tool head attached to the first-coupling elements.

* * * * *